(12) United States Patent
Haugen et al.

(10) Patent No.: US 8,892,591 B1
(45) Date of Patent: Nov. 18, 2014

(54) PRESENTING SEARCH RESULTS

(71) Applicants: Frances B. Haugen, Mountain View, CA (US); Daniel M. Crichton, Eden Prairie, MN (US)

(72) Inventors: Frances B. Haugen, Mountain View, CA (US); Daniel M. Crichton, Eden Prairie, MN (US)

(73) Assignee: Google Inc., Mountain View, CA (US)

( * ) Notice: Subject to any disclaimer, the term of this patent is extended or adjusted under 35 U.S.C. 154(b) by 16 days.

(21) Appl. No.: 13/632,356

(22) Filed: Oct. 1, 2012

Related U.S. Application Data (60) Provisional application No. 61/541,920, filed on Sep. 30, 2011.

(51) Int. Cl.
*G06F 17/30* (2006.01)

(52) U.S. Cl.
USPC .......................... 707/767; 707/723; 707/727

(58) Field of Classification Search
USPC .......................................... 707/723, 727, 767
See application file for complete search history.

(56) References Cited

U.S. PATENT DOCUMENTS

| 7,984,004 B2 | 7/2011 | Andrew et al. |
| 8,577,862 B2 | 11/2013 | Petschulat et al. |
| 2006/0190447 A1 | 8/2006 | Harmon et al. |
| 2009/0271368 A1* | 10/2009 | Channell .......................... 707/3 |
| 2011/0184951 A1 | 7/2011 | Paparizos et al. |
| 2011/0196855 A1* | 8/2011 | Wable et al. .................. 707/711 |
| 2011/0258212 A1 | 10/2011 | Lu et al. |
| 2012/0036123 A1 | 2/2012 | Al Hasan et al. |
| 2012/0095976 A1* | 4/2012 | Hebenthal et al. ............ 707/706 |
| 2012/0265779 A1 | 10/2012 | Hsu et al. |

FOREIGN PATENT DOCUMENTS

| EP | 1693770 | 8/2006 |
| EP | 2584482 | 4/2013 |
| WO | 2012016194 | 2/2012 |

* cited by examiner

*Primary Examiner* — Etienne Leroux
*Assistant Examiner* — Cindy Nguyen
(74) *Attorney, Agent, or Firm* — Fish & Richardson P.C.

(57) ABSTRACT

Methods, systems, and apparatus, including computer programs encoded on computer storage media, for presenting search results. One of the methods includes receiving a first content request, the first content request comprises one or more search terms received within a social networking application. The method includes determining a first level of popularity of the first content request, the first level of popularity based on the frequency with which the first content request has been previously submitted. The method includes comparing the first level of popularity to a second level of popularity, the second level of popularity based on the frequency with which a second query has been previously submitted. The method includes determining that the second level of popularity exceeds the first level of popularity. The method includes determining search results responsive to the second content request. The method includes providing at least one of the search results.

21 Claims, 6 Drawing Sheets

PRESENTING SEARCH RESULTS

CROSS-REFERENCE TO RELATED APPLICATIONS

This application claims priority to U.S. Provisional Application Ser. No. 61/541,920, filed on Sep. 30, 2011, entitled "PRESENTING SEARCH RESULTS," the entire contents of which are hereby incorporated by reference.

BACKGROUND

This specification relates generally to presenting search results.

Search engines identify resources (e.g., images, audio, video, Web pages, text, documents) that are relevant to a user's needs and present information about the resources in a manner that is useful to the user. For example, a search engine returns a set of search results in response to a user submitted query. A user may give more weight to search results that are associated with reviews, opinions, or other content associated with the user's social graph (e.g., contacts of the user).

SUMMARY

In general, one innovative aspect of the subject matter described in this specification can be embodied in methods that include the actions of receiving a first content request, the first content request comprises one or more search terms received within a social networking application. The method includes the actions of determining a first level of popularity of the first content request, the first level of popularity based, at least in part, on the frequency with which the first content request has been previously submitted within the social networking application within a predetermined period of time. The method includes the actions of comparing the first level of popularity to a second level of popularity, the second level of popularity based, at least in part, on the frequency with which a second query has been previously submitted within the predetermined period of time. The method includes the actions of determining, on one or more processing devices, that the second level of popularity exceeds the first level of popularity. The method includes the actions of determining plurality of search results that are responsive to the second content request. The method includes the actions of providing at least one of the plurality of search results.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Providing the plurality of search results may include causing a user to be directed to a resource associated with the at least one of the plurality of search results. The second content request may include one or more search terms that are different than the one or more search terms associated with the first content request. The method may include the actions of providing a control within the social networking application that, when activated, causes plurality of search results associated with the first content request to be provided. The method may include the actions of determining, on one or more processing devices, respective levels of popularity for the plurality of search results. Providing at least one of the plurality of search results may include providing at least plurality of search results based on the respective levels of popularity of the plurality of search results. Determining the respective levels of popularity may include determining respective levels of user activity associated with the one or more of search results. Determining respective levels of user activity may include determining respective numbers of users associated with the one or more of search results and ranking the one or more of search results according to the respective number of users. Providing at least one of the plurality of search results may include causing a user to be directed to a resource associated with the at least one of the plurality of search results. Providing at least one of the plurality of search results may include providing one or more alternate search terms that have higher respective levels of popularity than the one or more search terms.

These techniques can allow services such as social networking services to direct users to active and popular groups, media, communities, and other resources that a relate to the interests of the user expressed in a query. All or part of the systems and techniques described herein may be implemented as a computer program product that includes instructions that are stored on one or more non-transitory machine-readable storage media, and that are executable on one or more processing devices. All or part of the systems and techniques described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

The techniques presented in this disclosure relate to providing search results, for example, within a social networking service (e.g., a social networking Website). When a search engine receives a query (sometimes referred to as a content request), the search engine and/or its associated components can attempt to direct the user to popular search results. In some examples, a level of popularity of the submitted query (e.g., a frequency of a query over a period of time, e.g., an hour, a day, or a week) can be compared to respective levels of popularity of different, previously-submitted queries. If one or more of the different, previously-submitted queries are determined to have levels of popularity that exceed the level of popularity of the submitted query, search results can be presented based on the more popular previously-submitted queries. In some examples, search results can be presented based on a level of popularity of the resources included in the search results. These techniques can allow services such as social networking services to direct users to active and popular groups, media, communities, and other resources that a relate to the interests of the user expressed in a query.

Figure 1:
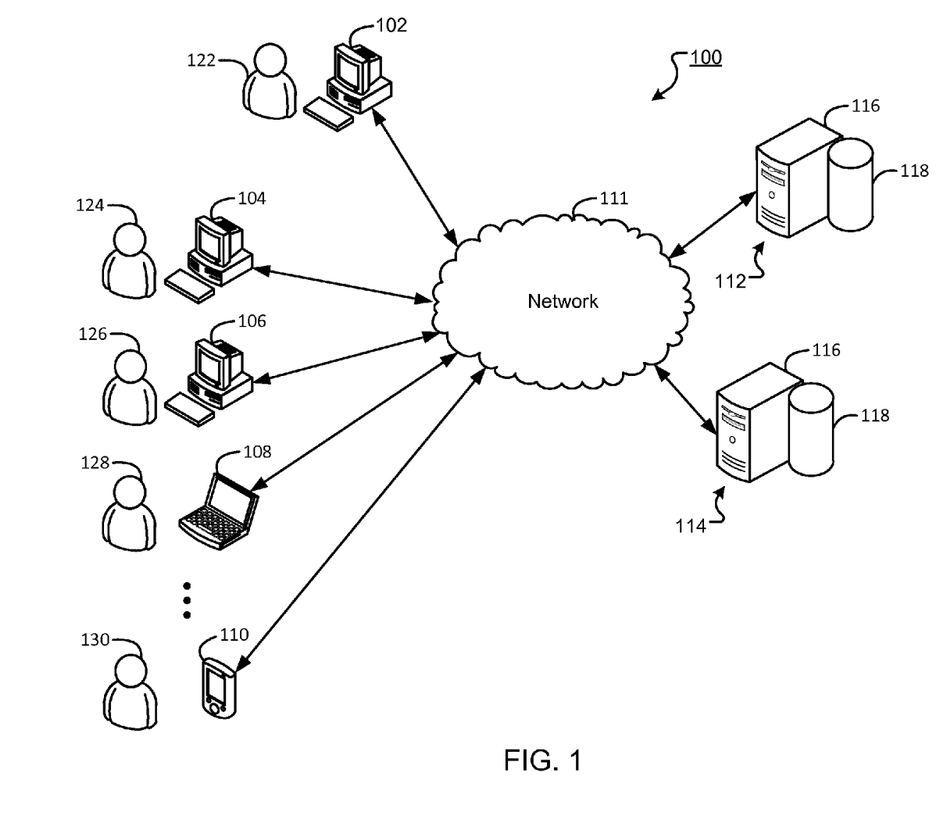
FIG. 1 is a block diagram showing an example of a network environment.

FIG. 1 is a block diagram showing an example network environment on which the process described herein for presenting search results may be implemented. In this regard, FIG. 1 shows an example network environment 100. The network environment 100 includes computing devices 102, 104, 106, 108, 110 that can each communicate with a first server system 112 and/or a second server system 114 over a network 111. Each of computing devices 102, 104, 106, 108, 110 has a respective user 122, 124, 126, 128, 130 associated therewith. Each of the first and second server systems 112, 114 includes a computing device 116 and a machine-readable repository, or database 118. Example environment 100 may include Web sites, computing devices and servers, which are not shown.

The network 111 can include a large computer network, examples of which include a local area network (LAN), wide area network (WAN), the Internet, a cellular network, or a combination thereof connecting a number of mobile computing devices, fixed computing devices, and server systems. The network(s) may provide for communications under various modes or protocols, examples of which include Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, for example, using a Bluetooth, WiFi, or other such transceiver.

Computing devices 102 to 110 enable respective users 122 to 130 to access and to view documents, for example, Web pages included in Web sites. For example, user 122 of computing device 102 can view a Web page using a Web browser. The Web page can be provided to computing device(s) 102 to 110 by server system 112, server system 114 or another server system (not shown). In example environment 100, computing devices 102, 104, 106 are illustrated as desktop-type computing devices, computing device 108 is illustrated as a laptop-type computing device 108, and computing device 110 is illustrated as a mobile computing device. It is appreciated, however, that computing devices 102 to 110 can each include a type of computing device, examples of which include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of two or more of these data processing devices or other appropriate data processing devices. In some implementations, a computing device can be included as part of a motor vehicle (e.g., an automobile, an emergency vehicle (e.g., fire truck, ambulance), a bus).

Figure 2:
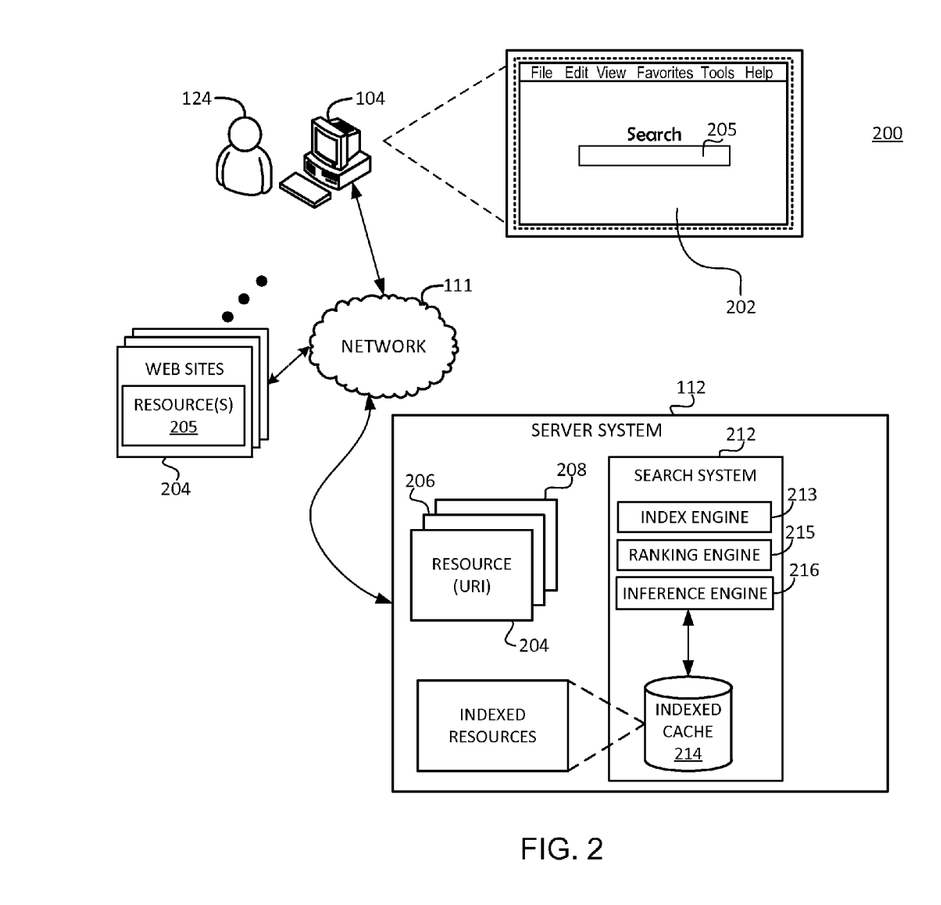
FIG. 2 is a block diagram of an example of a part of the network environment of FIG. 1.

FIG. 2 is a block diagram of an example part of the network environment of FIG. 1. In this regard, FIG. 2 shows a portion 200 of example network environment 100. In FIG. 2, computing device 104 communicates with server system 112 to display a Web page 202 of a Web site. Specifically, server system 112 stores a plurality of resources 204, 206, 208 which have respective resource identifiers (Resource ID). For example, the resource 204, 206, 208 can each correspond to different Web pages of the same Web site, or can correspond to Web pages of different Web sites.

To view a Web page, user 124 can input or select a Resource ID using a browser that is executed on computing device 104. The Resource ID can include, for example, a uniform resource indicator (URI) or a uniform resource locator (URL). A request including the Resource ID is transmitted from computing device 104 to server system 112 over network 111. In response, the server system identifies the requested resource based on the Resource ID, and transmits the resource to computing device 104 over network 111. For example, the resource may be a Web page, through which a user may access a search system. The Web page may include a field 205 for inputting search terms that are transmitted to the search system. In response, the search system performs a search of an indexed cache, and returns a search results list to a user. The search results list may include, e.g., connections to content that is relevant to the search terms.

Referring to FIG. 2, network environment 100 includes a search system 212 that identifies resources 205 by crawling and indexing resources provided by content publishers on Web sites 204. In this regard, search system 212 may include an indexing engine 213 that indexes resources (e.g., Web pages, images, or news articles on the Internet, microblog posts, social networking posts and annotations). Data about the resources 205 can be indexed based on the resource 205 to which the data corresponds. The indexed and, optionally, cached copies of the resources 205 can be stored in an indexed cache 214. A refinement engine 215 (or other software) ranks the resources that match the query. Social graph information, an example of which is described below, can be included in a same index as other resources or in a separate index (not shown). Search system 212 also includes an inference engine 216 for inferring affinity of a user to a party based on interaction(s) with online content associated with that party, as described below with respect to FIG. 3. Search system 212 may be implemented, e.g., on server system 214 as shown or on other appropriate hardware.

In response to a search query, search system 212 can access indexed cache 214 to identify resources 205 that are relevant to the search query. Search system 212 identifies resources 205 in the form of search results 218 and returns the search results to a requesting device in search results pages. A search result may be data generated by search system 212 that identifies a resource 205, and that includes a link to the corresponding resource. An example search result can include a Web page title, a snippet of text or a portion of an image extracted from the Web page, and the URL (Unified Resource Location) of the Web page.

Search system 212 takes into account social affinities that the user has to others when obtaining and presenting search results to the user. For example, a user's affinity to another party may be used to change (either increase or decrease) the ranking of future search results related to that party. Such affinities may also be used to promote online connection between the party and other parties, e.g., through social networking services.

In a social networking context, affinity can identify the closeness of a party to a user. For example, a contact of a contact who has five common middle contacts with the user has more of an affinity with the user (e.g., is considered closer to the user) than a contact of a contact who has only one common middle contact. Factors in determining affinity can include, e.g.: how a contact is connected to the user (e.g., a source of a connection), which social networking site the contact is a member of, whether contact or contact of contact, and how many paths to get to the contact of a contact (e.g., common middle contacts).

Affinity can also be based on the user's interactions with members of the social graph (e.g., the frequency of interaction, the type of interaction, and so forth). For example, a user that frequently clicks on posts by a particular contact can be considered to be closer to that contact than with other contacts where they click on respective posts less frequently. Likewise, if a user frequently "mouses-over" content by an author (e.g., a search result link), but does not select that content, the degree of affinity may be less than if the link is selected. Similarly, an amount of time viewing content may be an indicator that one party enjoys content from another party. The amount of time viewing particular content may be an indication that one party likes only that particular type of content from the other party.

In other examples, affinity can be defined by indirect interaction between users. For example, if two users interact with the same content regularly or frequently, those two users may be considered to have an affinity with each other. In still other examples, if two users interact with the same people regularly or frequently, those two users may be considered to have an affinity with each other.

Affinity can also be greater for particular types of interactions, for example, comments on contact's posts can result in a closer social connection than occasional endorsements. Affinity can change over time. For example, as the types or frequency of interactions change with members of the social graph, the resulting affinities can change as well.

Users can designate particular resources as endorsed, share resources, quote URLs, or otherwise indicate an interest or liking of content, examples of which include a particular resource, Web page, or search result. For example, an application, widget, or scripting can be provided in search results pages, Web pages, or within a browser application that allows a user to indicate liking, sharing, or other evaluation of an associated resource or search result. The user can mark the particular resource, Web site, or search results to indicate endorsement or other evaluation (e.g., through a browser control or user interface element presented with the associated content).

A social graph is one way to represent connection between two parties, which may, or may not, be on the same social networking service. A social graph is an association of connections among users and content, which may be depicted graphically. Types of connections in social graphs can include, but are not limited to, other users to which a user is in direct contact (e.g., user mail or chat contact, direct contacts on social sites) and users to which the user is in indirect contact (e.g., contacts of contacts, connections of users that have a direct connection to the user). In some examples, a direct connection may be unilateral or bilateral. In some implementations, a social graph includes content generated by individuals (e.g., blog posts, reviews) as connections to the user. The social graph can include connections within a single network or across multiple networks.

Distinct social graphs can be generated for different types of connections. For example, a user can be connected with chat contacts in one social graph, email contacts in a second social graph, and connections from a particular social network in a third social graph. Each social graph can include edges to additional parties at greater degrees of separation from the user. For example, an email contact can have its own email contacts to others adding a degree of separation from the user (e.g., user→email contact→contact of email contact). These contacts can, in turn, can have additional contacts at another degree of separation from the user. Similarly, a party's connection to someone in a particular social network can be used to identify additional connections based on that person's connections. Distinct social graphs can include edges connecting one or more social graph to one or more other social graphs. Thus, a social graph can include a single social graph or multiple interconnected social graphs.

Affinity between members of a social graph can be represented by edges, e.g., in a database that stores data for the social graph. These edges can be weighted, either in that database or elsewhere, to reflect a level of affinity between two parties connected in the social graph. Affinity between parties can be content specific. For example, social graph data may identify specific types of content associated with an edge between parties and specific affinities for that content. For example, the social graph data may specify that, between two connected parties, the first party has a first level of affinity for the second party's videos and a second, different level of affinity for the second party's written work. Similarly, the social graph may specify that the second party has a third, different level of affinity for the first party's blogs.

Figure 3:
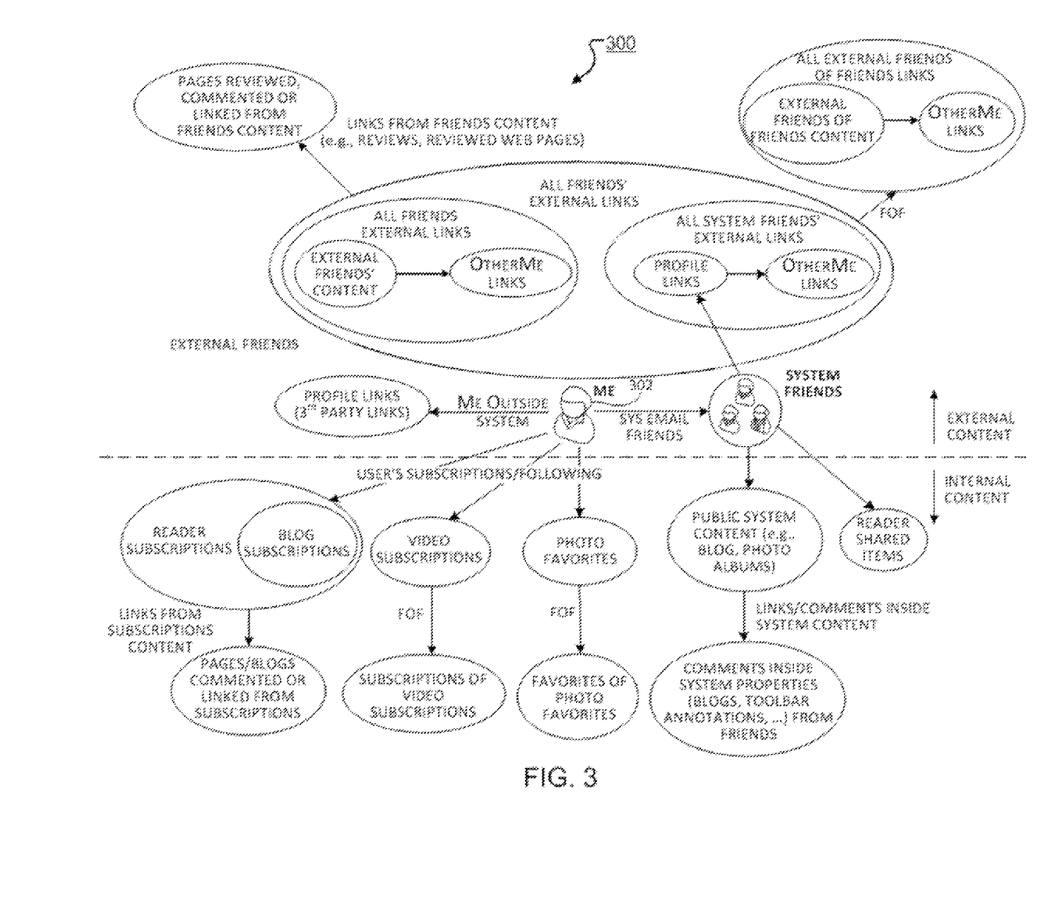
FIG. 3 is a conceptual view of an example of a social graph.

FIG. 3 is a conceptual view of an example social graph 300. In this regard, FIG. 3 shows sources of information for a social graph. In this example, the user's social graph is a collection of connections (e.g., users, resources, etc.) identified as having a relationship to the user 302 within some degree of separation. The user's social graph can include people and particular content at different degrees of separation. For example, the social graph of a user can include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

Diagram 300 shows a user 302 and the different connections that are possible to extend the user's social graph to people and content both within a system and across one or more external networks. For example, the user can have a profile or contacts list that includes a set of identified contacts, a set of links to external resources (e.g., Web pages), and subscriptions to content of a system (e.g., a system that provides various content and applications including e-mail, chat, video, photo albums, feeds, or blogs). Likewise, blogs that include links to a user's contacts may be part of the user's social graph. Each of these groups can be connected to other users or resources at another degree of separation from the user. For example, contacts of the user each may have their own profile that includes links to resources as well as contacts of the respective contacts. In another example, a user may be connected to a social networking account. That social networking account may reference an article in a newspaper. A social connection, therefore, may be established between the user and the author of the article.

In some implementations, the connections to a user within a specified number of degrees of separation can be considered the social graph of the user. Membership and degree of separation in the social graph may be based on other factors, including a frequency of interaction. For example, a frequency of interaction by the user (e.g., how often the user visits a particular social networking site) or type of interaction (e.g., endorsing, selecting, or not selecting items associated with contacts). As interaction changes, the relationship of a particular contact in the social graph can also dynamically change. Thus, the social graph can be dynamic rather than static.

Figure 4:
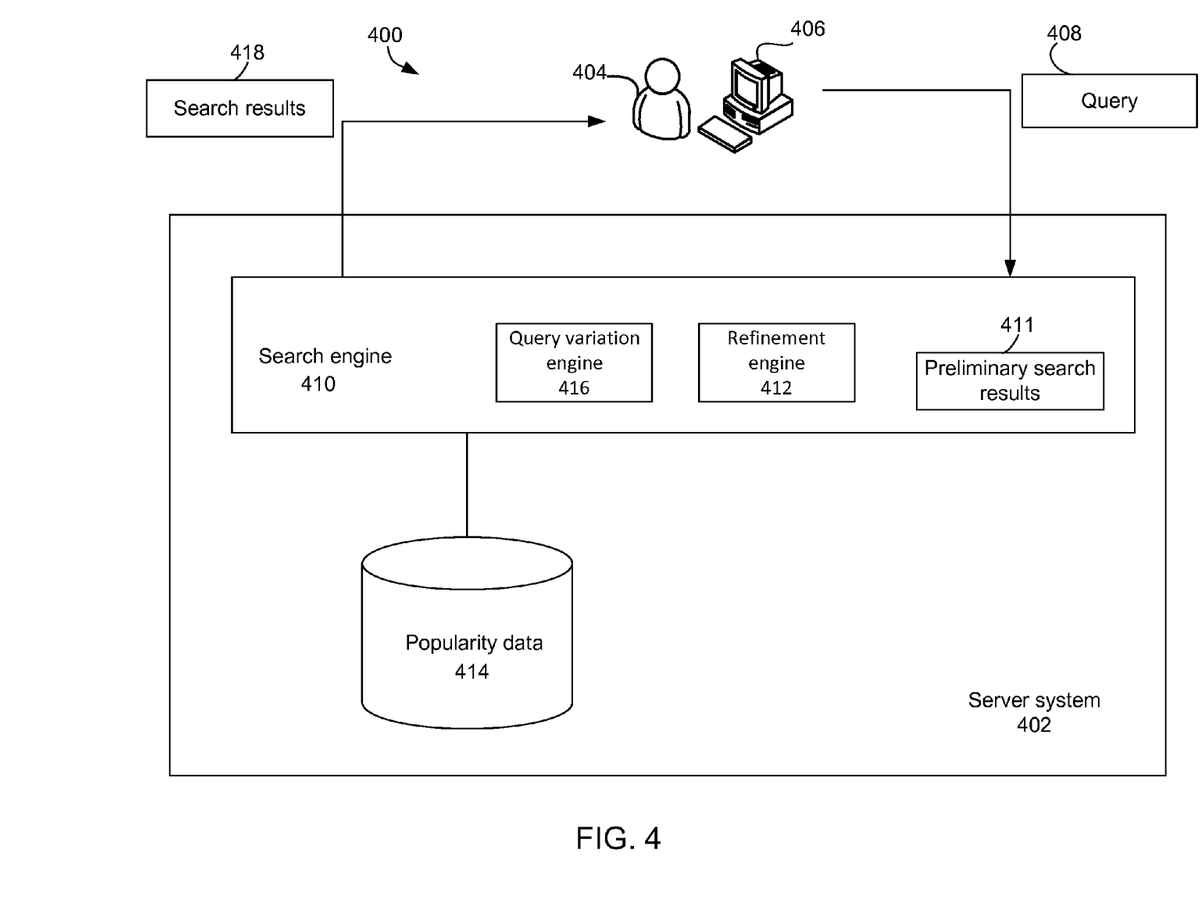
FIG. 4 is block diagram of an example of a search system.

FIG. 4 shows a system 400 that includes a server system 402 that communicates with a user 404 via a user device 406. In some examples, the server system 402 communicates with the user device over a network (e.g., the Internet). As described above, the user device 406 may submit a query 408 (e.g., search requests) to the server system 402, which may be associated with a social networking service (e.g., a social networking Web site). In some examples, the query 408 includes one or more search terms (e.g., one or more keywords) provided by the user 404 which can be used by the server system 402 to return a resource that is responsive to the query 408. For example, the query 408 may include search terms that relate to subject matter in which the user is interested (e.g., the query 408 can include one or more keywords that relate to a topic in which the user 404 is interested).

The query 408 is received by a search engine 410 associated with the server system 402. In some examples, the search engine 410 can identify resources (e.g., images, audio, video, Web pages, text, documents) that are relevant to the query 408 and present information about the resources in a manner that is useful to the user 404. For example, if the query 408 is a query for resources that match one or more keywords specified by the query 408, the search engine 410 may identify one or more resources (e.g., user groups, articles, or user content postings) that satisfy the query 408 (e.g., by determining that one or more of the keywords in the query 408 match or resemble names or titles associated with the resources). After the search engine 410 has identified one or more resources that satisfy the query 408, the search engine 411 (or other entity) may further process the preliminary search results 411. The resources that are identified can be limited to resources that the user is authorized to access, e.g., public data, and private data that the user has permission to access.

In some examples, the search engine 411 includes a refinement engine 412. The refinement engine may use stored information (e.g., popularity data 414) to analyze the preliminary search results 411. For example, if the preliminary search results 411 identify multiple resources that satisfy the query 408, the refinement engine 412 may use the popularity data 414 to refine the preliminary search results 411 (e.g., to present adjusted search results 418 to the user 404). In some examples, the refinement engine 412 can use the popularity data 414 to determine respective popularity levels of the preliminary search results 411. For example, the refinement engine 412 may use the popularity data 414 to rank the resources in the preliminary search results 411 according to their popularity (e.g., based on a number of users associated with a resource, or a number of times the resource has been viewed, favorited, bookmarked, "liked," or shared by users).

In some examples, the refinement engine 412 can determine the respective popularity levels of the preliminary search results 411 by calculating (or accessing) popularity scores for the resources within the preliminary search results 411. Popularity scores can be, for example, a numerical score that is based on values of one or more parameters. Parameters can include a number of users associated with a resource (e.g., the number of users that belong to a group), or a number of times the resource has been viewed, favorited, bookmarked, endorsed, or shared by users. Such parameters can be stored, for example, as popularity data 414. Popularity scores can also be influenced by the recency of any of the parameters (e.g., parameters can be weighted based on how recently the values for the parameters have been obtained, e.g., more recent data can be weighted favorably). In some examples, the popularity data 414 is stored information that identifies how popular a user (or a user's profile) is within a social networking application. For example, the level of popularity associated with a user profile can be influenced by a number of user profiles linked to, or associated with, the user profile in question. User profiles can be linked or associated with one another by friend status, subscriber status, follower status, or by other links and connections within a social graph or social networking service. While in this example the popularity data 414 is shown as being stored on the server system 402, the data can be stored anywhere that is accessible to the search engine 410 (e.g., stored in a remote location that is accessible by the search engine 410 over one or more networks).

In some examples, the refinement engine 412 can compare popularity levels of the preliminary search results 411 with a threshold to identify resources in the preliminary search results 411 that either exceeds, or falls below, the threshold. Based on this determination, the refinement engine 412 can take one or more actions. For example, if a popularity level of a resource within a search result falls below a popularity threshold (e.g., if a comparison of the popularity level and a popularity threshold results in a determination that a user would more likely be interested in a different resource, or would unlikely be interested in the evaluated resource), the refinement engine 412 may cause the search engine 410 to search for other, more popular, resources to include in the preliminary search results 411. Furthermore, as a result of the same determination, the resource with the popularity level below the threshold can be excluded from the preliminary search results 411. The value of the threshold can be based on user preferences (e.g., user preferences associated with an application that submits queries to the search engine 410, default levels (e.g., a predetermined level provided by the server system 402), or can be variable and/or dynamic based on a number of factors (e.g., the subject matter associated with the query 408, or information associated with the user 404, e.g., demographic information and geographic location information). Furthermore, in some examples, an aggregate popularity level can be determined for the preliminary search results 411 (e.g., an aggregate score that is based on underlying popularity values of the resources included in the preliminary search results 411). The aggregate popularity level can also be compared to a respective threshold to determine whether additional actions should be taken that are similar to those described herein with regard to individual popularity level comparisons.

The search engine 410 may also include a query variation engine 416. In some examples, the query variation engine 416 may use the query 408 to determine the existence of any different queries that are associated with similar subject matter. The query variation engine 416 may collaborate with other components of the server system 402 (e.g., the refinement engine 412, the search engine 410, and the popularity data 414) in order to generate alternate queries. In some examples, the query variation engine 416 can attempt to identify queries that are related to the query 408 (e.g., in regard to the subject matter of the query 408) but return more relevant and/or more popular results.

In some examples, if the refinement engine 412 determines that the popularity level of one or more of the resources in the preliminary search results 411 falls below a threshold, the query variation engine 416 can be instructed to generate and/or identify different queries for similar subject matter that return search results that includes resources having a relevancy or popularity level that exceeds the threshold. Other conditions may also cause the query variation engine 416 to attempt to generate alternate queries. For example, the query variation engine 416 can be configured to generate alternate queries anytime a query is received by the search engine 410, or may generate alternate queries based on user preferences or settings associated with the user 404 that provided the query 408.

In some examples, the refinement engine 412 may determine either that the level of popularity associated with the query 408 is lower than a threshold value, or is lower than the level of popularity of a second, related query. In this case, the refinement engine may instruct the query variation engine 416 to identify one or more alternate queries related to the query 408 but that are more popular queries within a given time frame than the query 408. Stated differently, alternate related queries can be identified that are more popular than the query 408 submitted by the user 404, and preliminary search results 411 need not be generated. For example, if a query for "baseball" is submitted while the World Series is being played during the Major League Baseball season, the query variation engine 416 could identify that the query "baseball world series" is currently (e.g., within a defined time frame, such as a week, day, or hour) more popular than the query term "baseball." As a result, the search engine 410 can generate the search results 418 and may provide them to the user 404 without first generating the preliminary search results 411. Instead, the search results 418 are the first search results generated in connection with the query 408, and the search results 418 are generated based on (e.g., are responsive to) an alternate query provided by the query variation engine 416. The popularity of various queries can be stored, for example, as part of the popularity data 414.

In some examples, if the refinement engine 412 determines that the popularity level of one or more of the resources in the preliminary search results 411 falls below a threshold (e.g., if a comparison of the popularity level of the submitted query and a popularity threshold results in a determination that a user would more likely be interested in resources associated with a different query, or would unlikely be interested in the resources associated with the evaluated query), the query variation engine 416 can be instructed to generate and/or identify different queries for similar subject matter that return search results that includes resources having a relevancy or popularity level that exceeds the threshold. Other conditions may also cause the query variation engine 416 to attempt to generate alternate queries. For example, the query variation engine 416 can be configured to generate alternate queries anytime a query is received by the search engine 410, or may generate alternate queries based on user preferences or settings associated with the user 404 that provided the query 408.

In some examples, evaluating the popularity of a given query within a time period against the popularity of other related, previously-received queries within a similar time period can allow the user to be directed to resources which are more likely to be active (e.g., populated with, or frequented by, a desirable number of other users). For example, if a user submits a query (e.g., using the keyword "baseball") for a group within a social networking application, the search engine 410 might return a set of search results that contain a wide variety of groups (e.g., groups associated with baseball supplies, baseball cards, baseball World Series, and baseball stadiums). However, using the techniques described above (e.g., comparing a popularity of the query "baseball" to other queries received within a certain time period, such as within the last hour), it may be determined that "baseball World Series" is a more popular query during that time period. Accordingly, the search engine 410 and its associated components may determine that presenting search results for the query "baseball World Series" would be more likely to be of interest to the user.

The techniques presented herein may increase the frequency with which a user is presented with mainstream results (e.g., fewer obscure or fringe results are presented in favor of more active, current, and/or popular results), which may promote social interaction among users. Using the same example, the user could be directed toward social networking groups related to the World Series (which may be, for example, a popular group with many other users during a particular time period, such as during game four of the World Series). In this example, providing search results on a second, more popular query (i.e., "baseball World Series") can present the user with search results which are a subset of a set of search results (e.g., preliminary search results) associated with the originally-submitted query (i.e., "baseball"). In some examples, the search results may be a subset of a set of search results associated with the originally-submitted query even if preliminary search results are not generated (e.g., even if no search is performed on the original query). This may allow a user to be presented with results which are focused on popularity within a given time period (e.g., social networking groups which have large, active communities).

After a sufficient set of search results has been generated (e.g., a set of search results in which the resources have popularity levels that exceed a threshold value, or a set of resources that are responsive to an alternate query having a value that exceeds a threshold value), search results 418 can be presented to the user 404. While in some examples the search results 418 can be identical to the preliminary search results 411, there may be situations (such as those described above) in which the search engine 410 has altered the preliminary search results 411 to generate the search results 418. For example, as described above, the search results 418 can include resources whose selection was triggered by the insufficiency of one or more resources associated with the preliminary search results (e.g., by one or more resources associated with the preliminary search results falling below a threshold popularity level). The search results 418 can then be presented on the user device 406 associated with the user 404 who submitted the query 408. An example presentation of search results within a social networking application is shown in FIG. 5.

Figure 5:
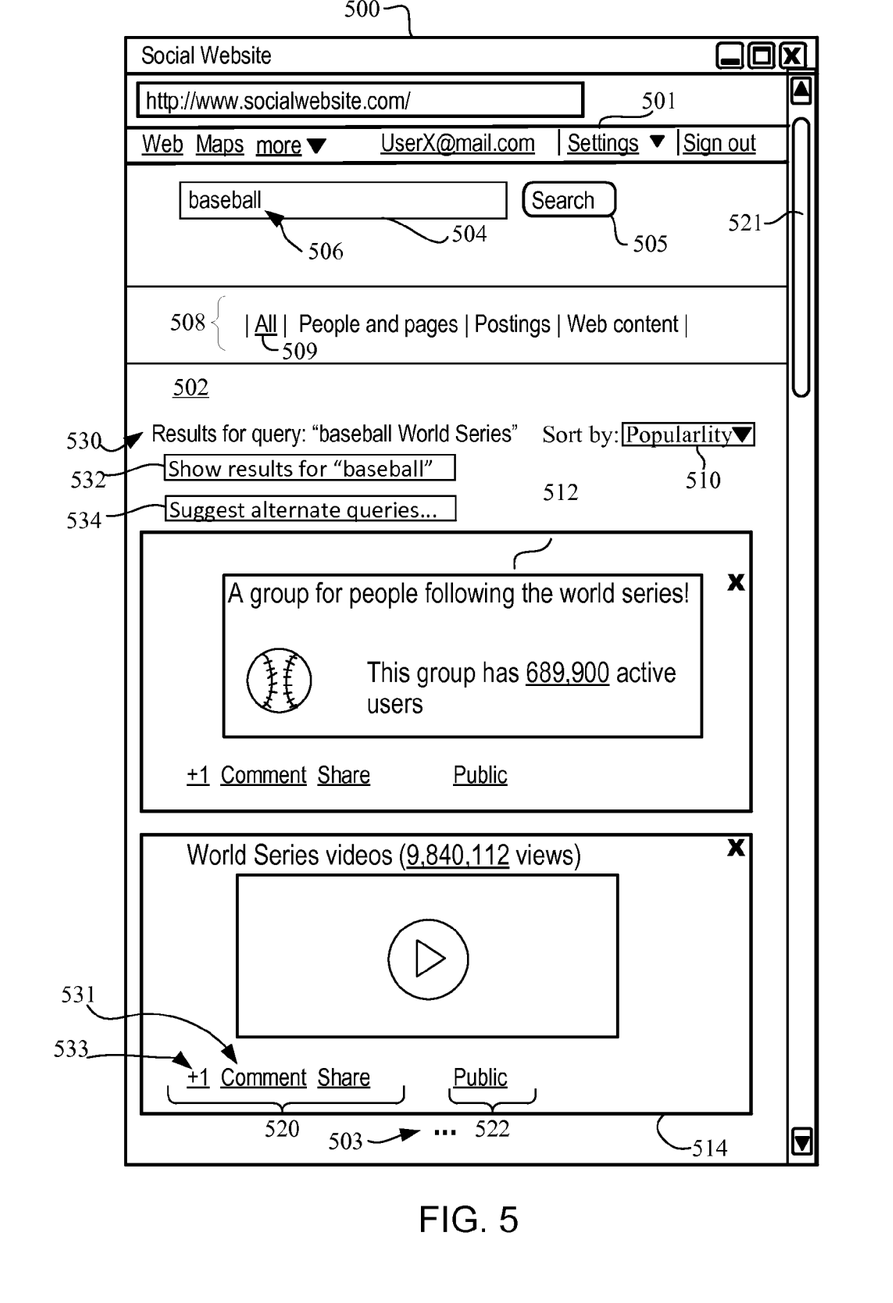
FIG. 5 is a diagram of an example of a user interface.

FIG. 5 shows a user interface 500 that displays a social networking service 501 (which, in this example, is a social website identified by the unique resource locator (URL) http://www.socialwebsite.com). In this example, the social networking service 501 includes a search field 504 in which a search query 506 (e.g., a text or image query) can be entered. In this example, the query 506 is the term "bikes". When the query 506 is submitted as a search query to a search engine associated the social networking service 501 (e.g., upon activation of the search control 505), the social networking service 501 may return a list of search results 502 that are responsive to the query 501 (e.g., a list of news articles, web search results, or other content).

In some examples, the type of content displayed in the list of search results 502 can be defined before or after the search is executed. For example, content filter controls 508 can be activated to limit the searched content to various categories of content. In this example, the "all" control 509 has been activated so that all content/resources will be searched that are associated with the search term 506 (i.e., the word "baseball," as shown) or other queries (e.g., any alternate queries, such as those described as being generated by the query variation engine 416 described above). In some examples, if the content filter controls 508 are activated before the search is executed, only the selected content might be searched.

If the content filter controls 508 are activated after a search has been executed, the list of search results 502 might be filtered to include only results from the selected category, or the search might be executed a second time. Other content categories that can be searched include people and pages (e.g., contacts associated with a user of the social networking Website 501), Web content (e.g., content available online that is not associated with the social networking Website 501), and other information. In some examples, privacy and permissions rules may govern the content that a given user may access and, as a result, the search results returned for that user might only include information that the user is authorized to access.

In FIG. 5, the first and second search results include controls 520. By activating the controls 520, a user to whom the first and second search results 512, 514 are displayed can perform various actions. For example, activation of the controls 520 allow a user to comment on the second search result 514 (e.g., by activating the comment control 531) or endorse the second search result 514 (e.g., using the endorse control 533).

The second search result 514 can also include a visibility indicator 522 (e.g., "public") which can indicate the visibility of the second search result 514. For example, if the visibility indicator 522 is "public," then the second search result 514 may be visible to any users of the social networking service 501. Other values of the visibility indicator 522 can include "private" (e.g., visible to the user only), "friends" (e.g., visible to the user's circle of friends), "family" (e.g., visible to the user's defined set family members), and so on. In some implementations, more than one value can be displayed for the visibility indicator 522. In some implementations, symbols can also be displayed adjacent to a value (e.g., a globe or Earth symbol displayed next to a "public" visibility indicator 522).

In some implementations, the second search result 514 can identify the number of users in a user's group (e.g., social circles, friends, family, etc.) who endorsed the second search result 514. For example, users (e.g., the user associated with the second search result 514, a user named Alice, and a user named Betty) may endorse the posting 106 by activating the endorse control 533. As a result, the second search result 514 can be updated to include a message (e.g., "You, Alice, Betty endorsed this").

In FIG. 5, the search results 502 include a first result 512, a second result 514, as well as one or more additional postings that are not currently visible. The one or more search results that are not currently visible are represented by the ellipses 503 below the second result 514. The additional postings represented by the ellipses 503 can be viewed, for example, by scrolling down the list of search results 502 using the scroll control 521. The list of search results 502 can also be sorted according to a sort control 510 which, in this example, sorts the list of search results 502 primarily according to a popularity of the search results. The list of search results 502 may be sorted primarily or secondarily by one or more other factors, for example, an age of the search results (e.g., by sorting the list of search results 502 from new to old search results) or the type of search results. In some examples, whether a search result is new or old depends on a recency of the search result.

While the query 506 in FIG. 5 included the term "baseball," the search results 502 includes results for the adjusted query 530, which is the term "baseball world series." This alteration in the query term may result from a situation in which, for example, the query "baseball world series" was more popular than the query "baseball" within a given timeframe (e.g., within the last hour), or the search results for the term "baseball world series" have a higher level of popularity than the term "baseball." In this example, an indication of the adjusted query 530 is presented that indicates that an alternate query (i.e., "baseball World Series") has been used to identify the search results 502. A original query control 532 may also be provided that, when activated, causes the social networking service to present search results that are responsive to the original query 506 (i.e., "baseball"). This allows users to revert back to their original queries.

In some examples, alternate query suggestions may also provided to the user. For example, a suggestion control 534 may be presented that, when activated, may display one or more additional queries that may be of interest to the user (e.g., in a pop-up box, an expanded field, or in some other format). The additional suggested queries may be, for example, variations of the query 506 entered by the user, and may have varying levels of popularity. In some examples, alternate queries may be automatically displayed within the interface (e.g., a control would not necessarily be displayed within the interface 500). Selection of one or more of the suggested queries could result in the determination and presentation of alternate search results. Some measure of popularity may be displayed in combination with any of the queries (e.g., the original query 506, any of the suggested queries, or the altered query 530). For example, a popularity score, rank, or level may be graphically represented near the corresponding query (e.g., a numerical score may be provided in parenthesis next to any suggested queries after they have been rendered on the user interface 500, e.g., upon activation of the suggestion control 534).

Figure 6:
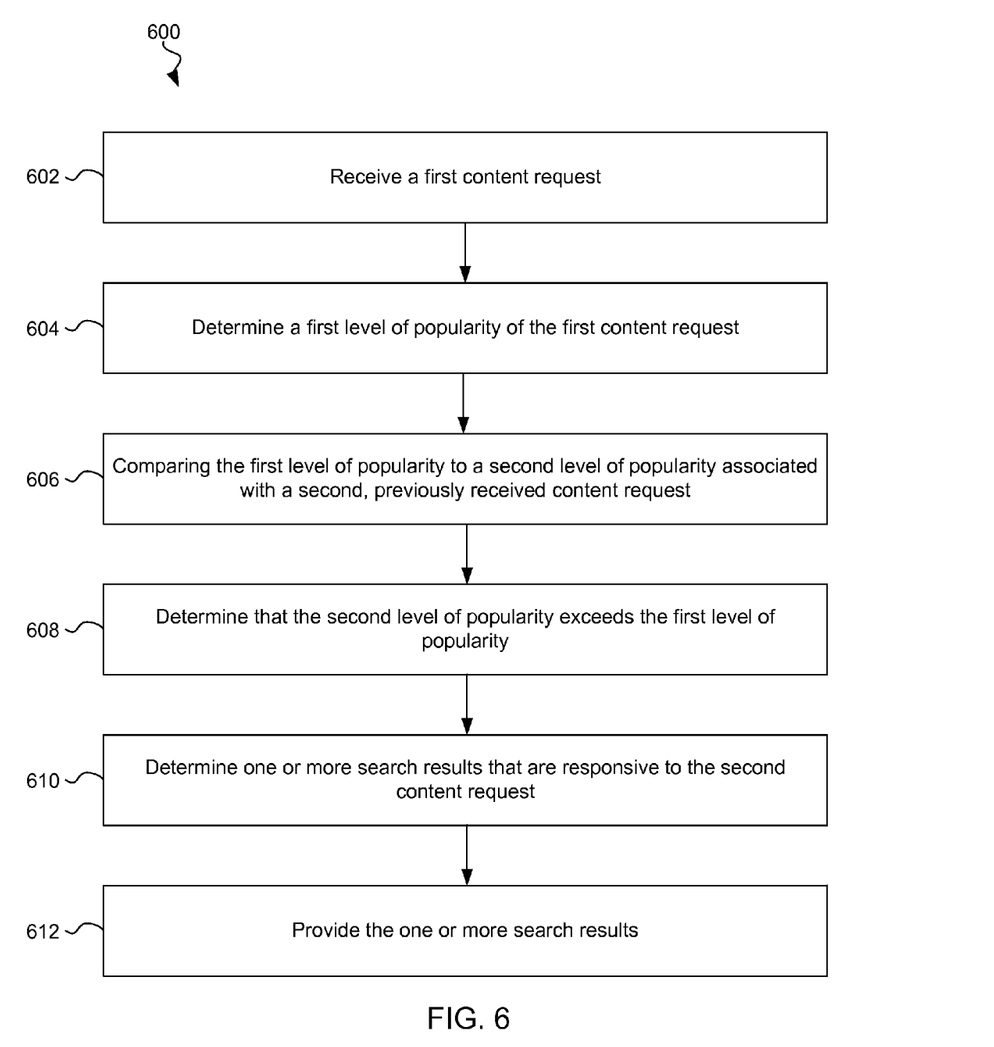
FIG. 6 is a flow chart of an example of a process for providing search results.

FIG. 6 shows illustrates process 600 for providing search results. A first content request is received (602). For example, a social networking application may receive a query that includes one or more keywords. The keywords may be associated with subject matter for which a user is searching within a social networking application. A first level of popularity of the first content request is determined (604). For example, a search engine (or other entity, such as the refinement engine 412) may determine a numerical score that represents a level of popularity of the first content request, where the numerical score is based on a frequency with which the first content request has been previously submitted within a given period of time (e.g., within the last hour).

The first level of popularity is compared to a second level of popularity associated with a second, previously received content request (606). In some examples, the second, previously received content request relates to similar subject matter as the first content request, and the second level of popularity is based on a similar period of time as the first content request. It is determined that the second level of popularity exceeds the first level of popularity (608). For example, it may be determined that more users have submitted the second content request than the first content request within a given time period.

One or more search results are determined that are responsive to the second content request (610). For example, as a result of determining that the second level of popularity exceeds the first level of popularity, a search engine may determine one or more search results that are responsive to the second, more popular content request. The one or more search results are provided (612). For example, a search engine may provide the one or more search results to a social networking service for presentation to a user who submitted the first content request (e.g., within a social networking service).

In some examples, the search terms associated with the second content request can be presented along with the search results. This may indicate to the user that the search results are based on a content request that is different from the content request originally submitted by the user. A control may also be provided that, when activated, causes one or more search results associated with the first content request to be provided. Activation of such a control may allow a user to view search results that are based on the originally submitted content request.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engine described herein can be separated, combined or incorporated into a single or combined engine. The engines depicted in the figures are not intended to limit the systems described herein to the software architectures shown therein.

In the context of this disclosure, the terms social network and social networking service may be used interchangeably.

In some implementations, the engines described herein can be separated, combined or incorporated into a single or combined engine. The engines depicted in the figures are not intended to limit the systems described here to the software architectures shown in the figures.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

Other implementations not specifically described herein are also within the scope of the following claims.

What is claimed is:

1. A method comprising:
   receiving a first content request, the first content request comprising one or more search terms received within a social networking application;
   determining a first level of popularity of the first content request, the first level of popularity based, at least in part, on a frequency with which the first content request has been previously submitted within the social networking application within a predetermined period of time;

comparing the first level of popularity to a second level of popularity, the second level of popularity based, at least in part, on a frequency with which a second content request has been previously submitted within the predetermined period of time;

determining, on one or more processing devices, that the second level of popularity exceeds the first level of popularity;

determining a plurality of search results that are responsive to the second content request;

determining, on one or more processing devices, respective levels of popularity for the plurality of search results; and providing at least one of the plurality of search results comprising:
  providing at least a plurality of search results based on the respective levels of popularity of the plurality of search results; and
  providing one or more alternate search terms that have higher respective levels of popularity than the one or more search terms.

2. The method of claim 1, wherein providing at least a plurality of search results comprises causing a user to be directed to a resource associated with the at least one of the plurality of search results.

3. The method of claim 1, wherein the second content request comprises one or more search terms that are different from the one or more search terms associated with the first content request.

4. The method of claim 3, further comprising providing a control within the social networking application that, when activated, causes a plurality of search results associated with the first content request to be provided.

5. The method of claim 1, wherein determining the respective levels of popularity comprises determining respective levels of user activity associated with the plurality of search results.

6. The method of claim 5, wherein determining respective levels of user activity comprises determining a respective number of users associated with the plurality of search results; and
  ranking the plurality of search results according to the respective number of users.

7. The method of claim 5, wherein providing at least one of the plurality of search results comprises causing a user to be directed to a resource associated with the at least one of the plurality of search results.

8. A system comprising:
  one or more computers and one or more storage devices storing instructions that are operable, when executed by the one or more computers, to cause the one or more computers to perform operations comprising:
    receiving a first content request, the first content request comprising one or more search terms received within a social networking application;
    determining a first level of popularity of the first content request, the first level of popularity based, at least in part, on a frequency with which the first content request has been previously submitted within the social networking application within a predetermined period of time;
    comparing the first level of popularity to a second level of popularity, the second level of popularity based, at least in part, on a frequency with which a second content request has been previously submitted within the predetermined period of time;
    determining, on the one or more computers, that the second level of popularity exceeds the first level of popularity;
    determining a plurality of search results that are responsive to the second content request;
    determining, on the one or more computers, respective levels of popularity for the plurality of search results; and
    providing at least one of the plurality of search results comprising:
      providing at least a plurality of search results based on the respective levels of popularity of the plurality of search results; and
      providing one or more alternate search terms that have higher respective levels of popularity than the one or more search terms.

9. The system of claim 8, wherein providing at least a plurality of search results comprises causing a user to be directed to a resource associated with the at least one of the plurality of search results.

10. The system of claim 8, wherein the second content request comprises one or more search terms that are different from the one or more search terms associated with the first content request.

11. The system of claim 10, wherein the one or more computers and one or more storage devices further store instructions that are operable, when executed by the one or more computers, to cause the one or more computers to perform operations comprising providing a control within the social networking application that, when activated, causes a plurality of search results associated with the first content request to be provided.

12. The system of claim 8, wherein determining the respective levels of popularity comprises determining respective levels of user activity associated with the plurality of search results.

13. The system of claim 12, wherein determining respective levels of user activity comprises determining a respective number of users associated with the plurality of search results; and
  ranking the plurality of search results according to the respective number of users.

14. The system of claim 12, wherein providing at least one of the plurality of search results comprises causing a user to be directed to a resource associated with the at least one of the plurality of search results.

15. A non-transitory computer storage medium encoded with computer program instructions that when executed by one or more computers cause the one or more computers to perform operations comprising:
  receiving a first content request, the first content request comprising one or more search terms received within a social networking application;
  determining a first level of popularity of the first content request, the first level of popularity based, at least in part, on a frequency with which the first content request has been previously submitted within the social networking application within a predetermined period of time;
  comparing the first level of popularity to a second level of popularity, the second level of popularity based, at least in part, on a frequency with which a second content request has been previously submitted within the predetermined period of time;
  determining, on one or more computers, that the second level of popularity exceeds the first level of popularity;
  determining a plurality of search results that are responsive to the second content request;

determining, on one or more computers, respective levels of popularity for the plurality of search results;

providing at least one of the plurality of search results comprising:

providing at least a plurality of search results based on the respective levels of popularity of the plurality of search results; and providing one or more alternate search terms that have higher respective levels of popularity than the one or more search terms.

16. The medium of claim 15, wherein providing at least a plurality of search results comprises causing a user to be directed to a resource associated with the at least one of the plurality of search results.

17. The medium of claim 15, wherein the second content request comprises one or more search terms that are different from the one or more search terms associated with the first content request.

18. The medium of claim 17, further comprising providing a control within the social networking application that, when activated, causes a plurality of search results associated with the first content request to be provided.

19. The medium of claim 15, wherein determining the respective levels of popularity comprises determining respective levels of user activity associated with the plurality of search results.

20. The medium of claim 19, wherein determining respective levels of user activity comprises determining a respective number of users associated with the plurality of search results; and ranking the plurality of search results according to the respective number of users.

21. The medium of claim 19, wherein providing at least one of the plurality of search results comprises causing a user to be directed to a resource associated with the at least one of the plurality of search results.

\* \* \* \* \*